US010254402B2

(12) United States Patent
 Lane

(10) Patent No.: US 10,254,402 B2
(45) Date of Patent: Apr. 9, 2019

(54) STEREO RANGE WITH LIDAR CORRECTION

(71) Applicant: Goodrich Corporation, Charlotte, NC (US)

(72) Inventor: Richard N. Lane, Westford, MA (US)

(73) Assignee: Goodrich Corporation, Charlotte, NC (US)

( * ) Notice: Subject to any disclaimer, the term of this patent is extended or adjusted under 35 U.S.C. 154(b) by 167 days.

(21) Appl. No.: 15/016,026

(22) Filed: Feb. 4, 2016

(65) Prior Publication Data

US 2017/0227642 A1 Aug. 10, 2017

(51) Int. Cl.

| G01S 17/02 | (2006.01) |
| G01S 17/88 | (2006.01) |
| G01S 17/87 | (2006.01) |
| G01S 5/00 | (2006.01) |
| G01S 17/50 | (2006.01) |
| G01S 17/08 | (2006.01) |
| G01S 7/481 | (2006.01) |
| G06T 7/00 | (2017.01) |
| H04N 13/271 | (2018.01) |

(52) U.S. Cl.
CPC .......... *G01S 17/023* (2013.01); *G01S 7/4817* (2013.01); *G01S 17/08* (2013.01); *G06T 7/004* (2013.01); *H04N 13/271* (2018.05)

(58) Field of Classification Search
CPC ...... G01S 17/023; G01S 17/08; G01S 7/4817; G06T 7/004; H04N 13/0271
See application file for complete search history.

(56) References Cited

U.S. PATENT DOCUMENTS

| 5,988,862 | A | * | 11/1999 | Kacyra | ................ | G01B 11/002 |
| | | | | | | 382/195 |
| 6,069,565 | A | * | 5/2000 | Stern | ..................... | B64D 15/20 |
| | | | | | | 340/583 |
| 7,142,694 | B2 | * | 11/2006 | Hashimoto | ........ | G06K 9/00369 |
| | | | | | | 382/106 |
| 7,298,869 | B1 | * | 11/2007 | Abernathy | ........... | G06K 9/0063 |
| | | | | | | 324/323 |
| 7,399,220 | B2 | * | 7/2008 | Kriesel | ................ | A01K 11/008 |
| | | | | | | 452/157 |
| 7,499,638 | B2 | | 3/2009 | Arai et al. | | |

(Continued)

FOREIGN PATENT DOCUMENTS

WO WO-2015152829 A1 10/2015

OTHER PUBLICATIONS

Extended European Search Report for European Patent Application No. 17154854.8, dated Jun. 30, 2017.

*Primary Examiner* — Sathyanaraya V Perungavoor
*Assistant Examiner* — Philip P. Dang
(74) *Attorney, Agent, or Firm* — Locke Lord LLP; Scott D. Wofsy; Joshua L. Jones

(57) ABSTRACT

An apparatus for determining a distance to a target area includes an imaging system configured to provide at least two images of a target area. The images are associated with different imaging axes. A Lidar system including at least one laser is configured to direct an optical beam to the target and an optical detection system configured to receive a portion of the optical beam from the target area and establish a distance to the target area based on the received portion.

11 Claims, 3 Drawing Sheets

(56) References Cited

U.S. PATENT DOCUMENTS

| | | | | |
|---|---|---|---|---|
| 7,750,802 B1* | 7/2010 | Parish | G01N 21/64 250/370.01 |
| 8,180,507 B2* | 5/2012 | Dokken | G01S 13/9307 340/903 |
| 8,218,816 B2 | 7/2012 | Sonoura | |
| 8,331,624 B2* | 12/2012 | Braunecker | G01C 1/04 382/106 |
| 8,451,432 B2* | 5/2013 | Crawford | G01S 17/66 356/4.01 |
| 8,670,612 B2* | 3/2014 | Kido | G06K 9/4652 382/104 |
| 8,736,818 B2* | 5/2014 | Weimer | G01C 3/08 250/208.2 |
| 8,861,787 B2* | 10/2014 | Kido | G06K 9/00791 382/103 |
| 9,025,144 B2* | 5/2015 | Knox | G01N 15/06 356/338 |
| 9,127,911 B2* | 9/2015 | Varshneya | F41G 3/08 |
| 9,131,128 B2* | 9/2015 | Meyers | H04N 5/211 |
| 9,157,701 B2* | 10/2015 | Varshneya | F41G 3/165 |
| 2007/0177011 A1* | 8/2007 | Lewin | B62D 15/0285 348/118 |
| 2009/0147239 A1* | 6/2009 | Zhu | G01S 7/285 356/3.12 |
| 2010/0133424 A1* | 6/2010 | Lindsay | A63B 69/3632 250/237 R |
| 2010/0204974 A1 | 8/2010 | Israelsen et al. | |
| 2012/0038902 A1 | 2/2012 | Dotson | |
| 2012/0056982 A1* | 3/2012 | Katz | G06F 3/017 348/43 |
| 2012/0182392 A1* | 7/2012 | Kearns | B25J 11/009 348/46 |
| 2013/0226344 A1* | 8/2013 | Wong | G05D 1/024 700/258 |
| 2013/0300840 A1* | 11/2013 | Borowski | H04N 13/254 348/50 |
| 2013/0342657 A1 | 12/2013 | Robertson | |
| 2014/0201126 A1* | 7/2014 | Zadeh | G06K 9/627 706/52 |
| 2015/0219765 A1* | 8/2015 | Mead | H01S 3/06754 356/5.09 |
| 2015/0260843 A1* | 9/2015 | Lewis | G02B 26/108 356/5.01 |

* cited by examiner

STEREO RANGE WITH LIDAR CORRECTION

BACKGROUND OF THE INVENTION

Field of the Invention

The present disclosure relates to imaging, and more particularly to range imaging using Lidar and stereo imagery.

Description of Related Art

Range to a specified area can be calculated using stereo imagery. With small angular separation between image capture locations, small errors in the measured angle and baseline will propagate to significant errors in the range estimate. This results in requiring a bigger angular separation to reduce the error. However, this takes longer to collect the two images. Lidar (light detection and ranging) uses laser technology to make precise distance measurements over long or short distances. One application of Lidar is the range scanner, or scanning Lidar. Lidar transceivers operate on the principle of transmitting laser light that then reflects off of a given object and returns to a Lidar receiver. The distance to an object is then determined by analyzing the laser signal through various techniques. During the scanning process, the Lidar makes repeated range measurements to objects in its path. Through repeated measurements of an object by individual laser transmissions, the shape of the object can be determined. The resulting range data is collected and serves as a rough model of the scanned area. In many applications, obtaining high-resolution, high-fidelity shape information is desirable. Physical limitations of typical range scanners constrain the maximum spatial resolution of the range data, which decreases with distance from the range scanner. At large distances, the range scanner may not be able to discern surface details of an object.

Such conventional methods and systems have generally been considered satisfactory for their intended purpose. However, there is still a need in the art for improved system that allows for range identification that reduces the timeline from stereo pair only images. The present disclosure provides a solution for this need.

SUMMARY OF THE INVENTION

An apparatus for determining a distance to a target area includes an imaging system configured to provide at least two images of a target area. The images are associated with different imaging axes. A Lidar system includes at least one laser configured to direct an optical beam to the target area and an optical detection system is configured to receive a portion of the optical beam from the target area and establish a distance to the target area based on the received portion.

The laser system can be configured to scan a portion of the target area based on the at least two images from the imaging system. The imaging system can include a camera configured to produce a first image associated with a first axis at a first time and a second image associated with a second axis at a second time.

The apparatus can further include a processor coupled to the imaging system and laser system connected to a memory, wherein the memory includes instructions recorded thereon that, when read by the processor, cause the processor to receive the at least two images of the target area, receive the portion of the laser beam from the target area and provide the distance to the target area. The memory can include instructions recorded thereon that, when read by the image processor, cause the processor to provide a depth map of at least a portion of the target area based on the at least two images and the portion of the laser beam received. The laser can be configured to direct a focused optical beam to the target area. The laser system can be configured to scan the laser beam over the target area and establish distance estimates associated with a plurality of locations in the target area.

A method for determining a distance to a target area includes receiving two images of a target area wherein the two images are taken at different imaging axes for stereo imaging. The method also includes co-aligning an optical beam from a Lidar system to the target area. A portion of the optical beam can be received from the target area to establish an estimate of a target distance based on the received portion to extend the range accuracy of the Lidar system and/or fill in gaps between Lidar samples with the stereo imagery.

The method can further include selecting a portion of the target area to be scanned by the Lidar system based on the two images of the target area. The images can be based on a first image and a second image such that both images are associated with different imaging axes. The method can further include scanning the optical beam over the target area and establishing distance estimates associated with a plurality of locations in the target area.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
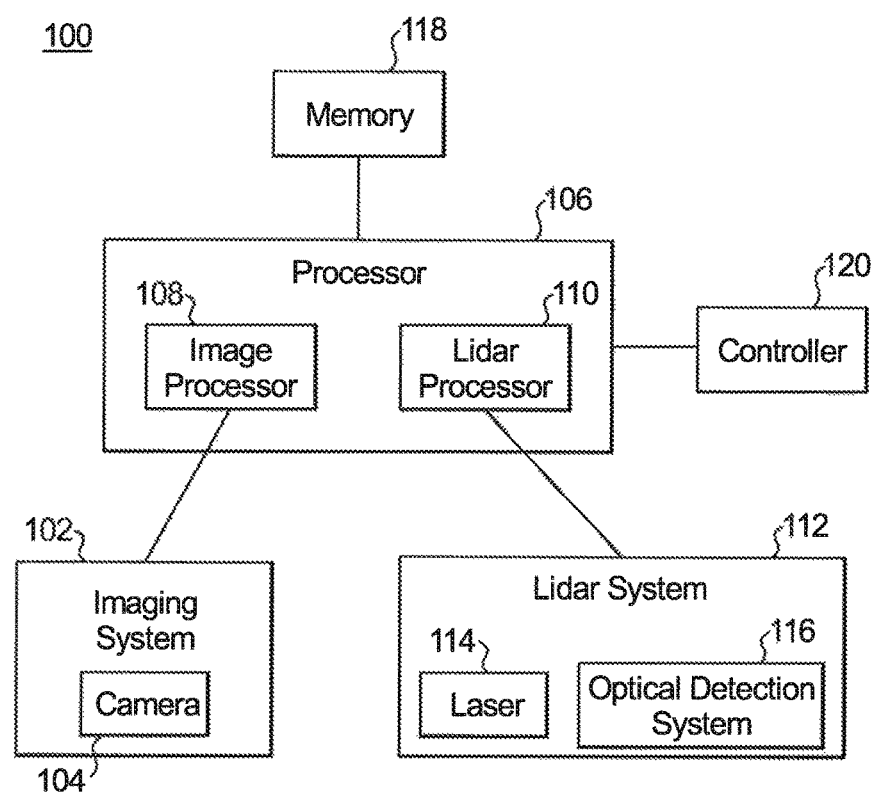
FIG. 1 is a schematic view of an exemplary embodiment of an apparatus constructed in accordance with the present disclosure, showing an imaging system co-aligned with a Lidar system.

Reference will now be made to the drawings wherein like reference numerals identify similar structural features or aspects of the subject disclosure. For purposes of explanation and illustration, and not limitation, a partial view of an exemplary embodiment of an apparatus for determining a distance to a target area in accordance with the disclosure is shown in FIG. 1 and is designated generally by reference character 100. Other embodiments of the apparatus in accordance with the disclosure, or aspects thereof, are provided in FIG. 2, as will be described.

FIG. 1 is a schematic view of an apparatus 100 that includes an imaging system and a Lidar system. The apparatus can be used, for example, on an aircraft designed to scan a target area while in motion. The Lidar system includes a laser 114 configured to deliver a laser/optical beam to a target area and an optical detection system 116 configured to receive a portion of the optical beam from the target area. The imaging system 102 includes a camera 104 configured to provide at least two images of at least some portions of a target area at different axes at different locations. The locations may be known locations and orientations. The images from the camera 104 are stereo images to capture features of the target area. Both the imaging system 102 and Lidar system 112 are electronically connected to a processor 106 that includes an image processor 108 and a Lidar processor 110. The processor 106 is in electronic communication with a memory 118 and a controller 120. The images from the imaging system and the optical beam are designed to occur simultaneously. In that respect both the imagining system 102 and Lidar system 112 can be mounted at a fixed position relative to one another for ease of calculation. Any known mounting techniques may be utilized.

Figure 2:
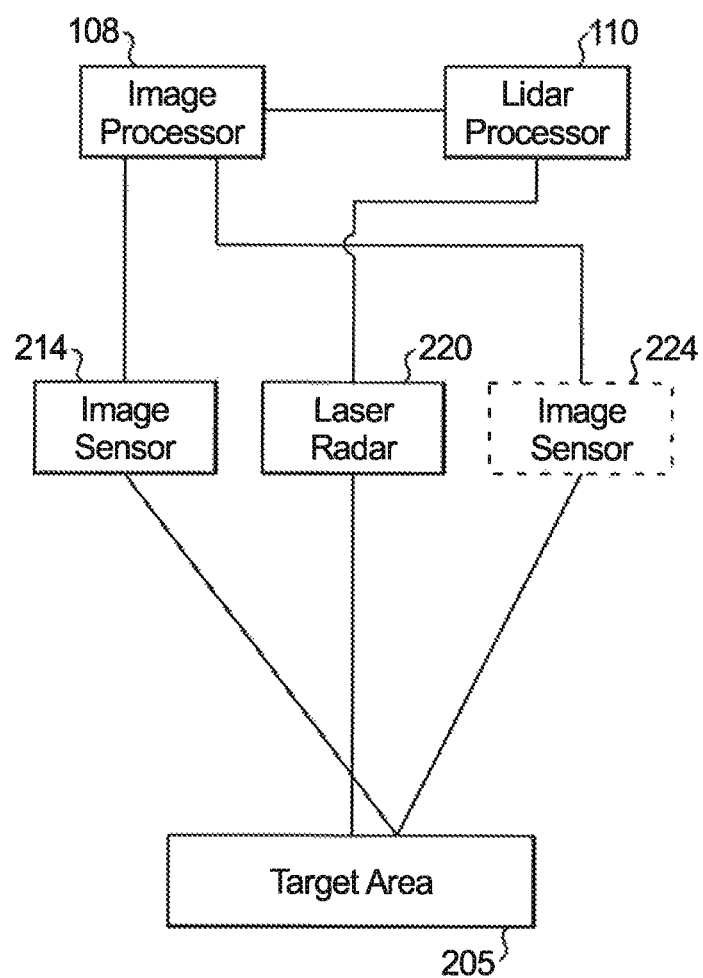
FIG. 2 is a schematic view of portion of the imaging and Lidar systems of FIG. 1, directed a target area.

FIG. 2 illustrates the apparatus in use 200 to scan a target area 205. Camera is configured to form images at image sensors 214, 224, respectively. The image sensors 214, 224 are from the same camera 104 shown as two separate locations for ease of illustration to represent at least two images taken a distance apart along separate axes. Typical stereo imaging systems are limited to the two images from the imaging system and require the angle between the separate axes to be precisely known to determine the distance to the target area. In contrast, with the use of the laser beam and the received portion of the beam, of the present disclosure, the distance to the target area is more easily and quickly determined. As shown, the laser 220 may be co-aligned with the image sensors 214, 224 to allow the laser processor 110 to accurately estimate the range to the target area. In further embodiments, the Lidar and imaging system can use portions of the same optics and/or isolation and/or line of sight stabilization and pointing control systems.

Figure 3:
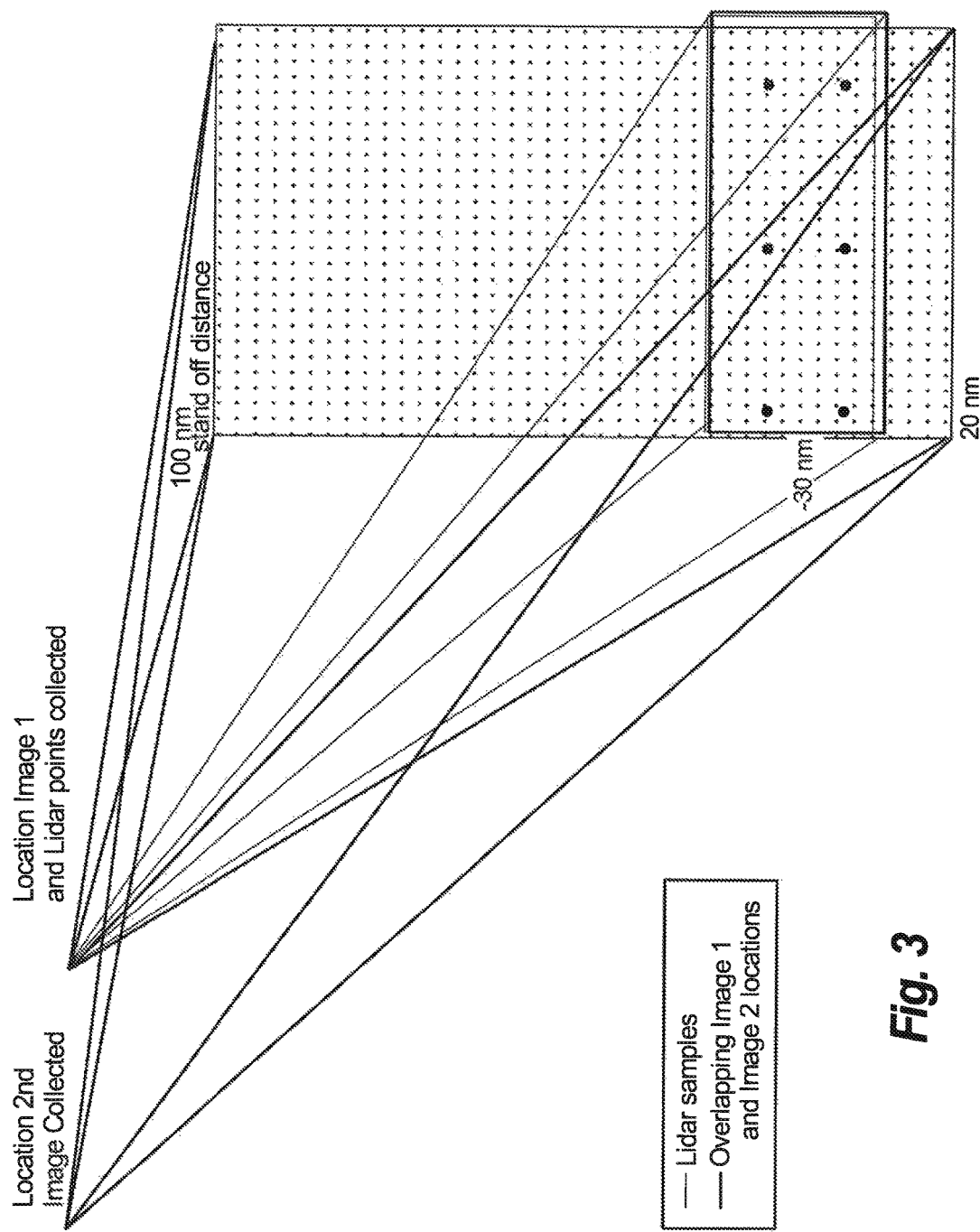
FIG. 3 is a schematic view of an example of two images taken of the same area with Lidar samples within the range of the two images.

The image processor 108 is coupled to receive image data from the image sensors 214, 224 and determine image characteristics such as displacements. The controller 120 processes the images received and controls the laser 220 to scan the target 205 and provide range estimates. The controller 120 is coupled to the Lidar system 112 and the camera 104 and identifies the target area to be scanned based on the stereoscopic images. With reference to FIG. 3, the combination of the imaging system for stereo images and the Lidar system designed to work together as described herein provides better information than is feasible with either system on its own. The stereo imagery covers a larger area and can be configured to have a finer sampling than the Lidar. Using the stereo imagery to provide a finer sample allows for coverage of a larger area and for areas at longer ranges which allows the Lidar system to require less size, weight, power and cost. For example, as shown in FIG. 3, taking a pair of stereo images that are two adjacent scans that go from 20 NM to 100 NM slant range from the imaging system that are collected within seconds of each other. With the laser co-aligned the range to a location at 30 NM can be determined and/or create a course grid of Lidar samples can be created. Correlating these locations with the stereo images now corrects for the error in the stereo images parallax angle to match the range from the Lidar. The samples from the images (smaller black dots) fill in between the Lidar samples (larger black dots). The apparatus can be used on aircrafts designed to scan a target area while in motion and also can be used on a ground vehicle or at a ground facility. In an airborne environment using the stereo pair images the range accuracy of the Lidar is extended to even farther ranges and used to fill in between the Lidar samples. On a ground vehicle or in a ground environment the stereo pair images would extend the area the Lidar covered thus allowing less chance of being detected and allow the distance between the locations for the stereo pair images to be smaller.

In embodiments, the controller 120 can be coupled to a design data base (not shown) and can compare laser radar derived target data with design data (and design tolerances) to determine if a scanned surface is acceptable based on design and design tolerances. If desired, the controller 120 can also generate visible images and provide images to a display (not shown), and overlay or juxtapose measured and design information as desired. Imaging systems as described above can be configured to provide depth estimates in addition to laser radar range measurements, to be used in targeting a laser radar to particular features of interest, or to provide a three dimensional map of a target and a target environment. In addition, the size and location, e.g. the location in the earth centered earth fixed coordinate system, of objects in the overlapping images can be determined using the system and method described herein.

As will be appreciated by one skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide for an apparatus with superior properties including determining distance to a target area using stereo imaging and Lidar. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An apparatus for determining a distance to a target area, comprising:
    a platform;
    at least one imaging system mounted to the platform configured to provide at least two images of a target area, wherein the images are associated with different imaging axes;
    a Lidar system mounted to the platform at a fixed position relative to the at least one imaging system and including at least one laser configured to direct a laser beam to the target area and an optical detection system configured to receive a portion of the laser beam from the target area and establish a distance to the target area based on the received portion; and
    a processor electronically connected to the at least one imaging system and the Lidar system, the processor in electronic communication with a memory having instructions recorded thereon that, when read by the processor, cause the processor to:
        co-align an optical beam from the Lidar system to the target area;
        receive the at least two images of the target area, wherein the platform moves between receiving a first one of the two images and receiving a second one of the two images, wherein the imaging system includes a camera configured to produce a first image associated with a first axis at a first time and a second image associated with a second axis at a second time, and wherein the two images are captured at a first sampling spatial resolution;
        receive the portion of the laser beam from the target area, wherein the laser beam scans at a second sampling spatial resolution coarser than the first sampling spatial resolution;
        provide the distance to the target area based on the laser beam scanning; and
        provide a depth map at the first sampling spatial resolution of the at least a portion of the target area that is corrected based on the distance to the target area based on the laser beam scanning at the second sampling spatial resolution.

2. The apparatus of claim 1, wherein the laser system is configured to scan a portion of the target area based on the at least two images from the imaging system.

3. The apparatus of claim 1, wherein the laser is configured to direct a focused laser beam to the target area.

4. The apparatus of claim 3, wherein the laser system is configured to scan the laser beam over the target area and establish distance estimates associated with a plurality of locations in the target area.

5. A method for determining a distance to a target area, comprising:
    moving a platform, wherein an imaging system and a Lidar system are mounted to the platform in a fixed position relative to one another;
    co-aligning an optical beam from the Lidar system to a target area;
    receiving first and second images of the target area, wherein the first and second images are taken at different imaging axes for stereo imaging due to the platform moving between receiving the first image and receiving the second image, and wherein the two images are captured at a first sampling spatial resolution;
    pointing a laser beam from a Lidar system at the target area;
    receiving a portion of the laser beam from the target area, wherein the laser beam scans at a second sampling spatial resolution coarser than the first sampling spatial resolution; and
    providing a depth map at the first sampling spatial resolution of the at least a portion of the target area that is corrected based on the distance to the target area based on the laser beam scanning at the second sampling spatial resolution.

6. The method of claim 5, further comprising selecting a portion of the target area to be scanned by the Lidar system based on the first and second images of the target area.

7. The method of claim 5, further comprising scanning the laser beam over the target area and establishing distance estimates associated with a plurality of locations in the target area.

8. The apparatus of claim 1, wherein the processor includes an image processor and a Lidar processor, the image processor coupled to the imaging system, the Lidar processor coupled to the Lidar system.

9. The method of claim 5, wherein at least one of the first and second images is acquired simultaneously with the laser beam scanning.

10. The apparatus of claim 1, wherein the first image and the second image are stereo images of a common target area, wherein the laser beam scanning is a scanning of the common target area.

11. The method of claim 5, wherein receiving first and second images of the target area includes receiving first and second stereo images of a common target area, wherein the laser beam scans are of the common target area.

\* \* \* \* \*